United States Patent [19]

Normandin et al.

[11] Patent Number: 5,384,222
[45] Date of Patent: Jan. 24, 1995

[54] IMAGING MEMBER PROCESSES

[75] Inventors: Sharon E. Normandin, Macedon; Kathleen M. Carmichael, Williamson; Donald P. Sullivan, Rochester, all of N.Y.; Nancy A. Listigovers, Oakville, Canada; Trevor I. Martin, Burlington, Canada; Gordon K. Hamer, Mississauga, Canada

[73] Assignee: Xerox Corporation, Stamford, Conn.

[21] Appl. No.: 84,106

[22] Filed: Jul. 1, 1993

[51] Int. Cl.⁶ .............................................. G03G 5/04
[52] U.S. Cl. .................................... 430/58; 430/132; 430/135
[58] Field of Search ...................... 430/58, 59, 69, 76, 430/78, 132, 135

[56] References Cited

U.S. PATENT DOCUMENTS

| | | | |
|---|---|---|---|
| 4,587,189 | 5/1986 | Hor et al. | 430/59 |
| 4,643,770 | 2/1987 | Hays | 106/23 |
| 4,728,592 | 3/1988 | Ohaku et al. | 430/59 |
| 5,166,339 | 11/1992 | Duff et al. | 540/141 |
| 5,189,156 | 2/1993 | Mayo et al. | 540/141 |

FOREIGN PATENT DOCUMENTS 0314100 5/1989 European Pat. Off. .

OTHER PUBLICATIONS

Makromol Chem. 183, 3099-3107 (1982), "Synthesis of AB and BAB Poly(styrene-b-4-vinylpyridine) and Solution Properties of Their Quaternized Compounds", Koji Ishizu et al.

Journal of Coatings Technology, vol. 58, No. 736, May 1986, pp. 71-82, "Use of A-B Block Polymers as Dispersants For Non-aqueous Coating Systems", Henry L. Jakubauskas.

*Primary Examiner*—John Goodrow
*Attorney, Agent, or Firm*—E. O. Palazzo

[57] ABSTRACT

A process for the preparation of a photogenerating composition which comprises mixing titanyl phthalocyanine Type IV with the AB block copolymer polystyrene-4-vinyl pyridine in a suitable solvent.

24 Claims, No Drawings

IMAGING MEMBER PROCESSES

BACKGROUND OF THE INVENTION

This invention is generally directed to imaging members, and more specifically, to layered photoconductive imaging member processes. In embodiments, the present invention is directed to the preparation of stable photoconductive imaging members with a titanyl phthalocyanine, especially a titanyl phthalocyanine Type IV photogenerating pigment by dispersing the titanyl phthalocyanine pigment in certain AB block copolymers, such as polystyrene/poly-4-vinyl pyridine thereby enabling a significant improvement in cyclic stability after extended imaging cycling, such as for example 10,000 imaging cycles in, for example, a xerographic imaging test fixture similar to the Xerox Corporation 5090.

Layered imaging members with titanyl phthalocyanines as photogenerating pigments are known. Many titanyl phthalocyanines, such as titanyl phthalocyanine Type IV, are adversely effected by solvents to the extent that the photosensitivity thereof can substantially decrease especially over extended time periods. Binders selected for the preparation of titanyl phthalocyanine dispersions include polyvinyl butryal, however, the cyclic stability of imaging members obtained from such dispersions decreases from a $V_{ddp}$ of 1,046–1,077 to a $V_{ddp}$ of 922–930 after 10,000 cycles, 12 to 14 percent cycle down. Also, increased charge current may be needed in the imaging apparatus, such as the Xerox Corporation 5090, to maintain the setup $V_{ddp}$, and eventually the current is depleted thereby shorting the life of the photoconductive imaging member by, for example, 30 percent. These and other disadvantages are avoided or minimized with the processes and imaging members of the present invention. Five primary main crystal forms of TiOPc include Types I, II, III, X, and IV as determined by X-ray powder diffraction traces. The diffractometer was equipped with a graphite monochrometer and pulse-height discrimination system. Two-theta is the Bragg angle commonly referred to in x-ray crystallographic measurements. I (counts) represents the intensity of the diffraction as a function of Bragg angle as measured with a proportional counter. Subclasses of these forms with broad, more poorly resolved peaks than those shown in FIGS. 1A, 1B, 1C, 1D and 1E can be envisioned, however, the basic features of the diffractograms indicate the major peaks in the same position although the smaller peaks can be unresolved. This broadening of XRPD peaks is generally found in pigments having a very small particle size.

In Mita EPO patent publication 314,100, there is illustrated the synthesis of TiOPc by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment.

In Mitsubishi Laid Open Japanese Application 90-269776, laid open date Nov. 5, 1990, the disclosure of which is totally incorporated herein by reference, there is illustrated the preparation of titanyl phthalocyanines by the treatment of phthalocyanines, such as metal free, metal phthalocyanines, or their derivatives with solvents containing at least trifluoroacetic acid, or mixed solvents of trifluoroacetic acid and halogenated hydrocarbons such as methylene chloride. In Example I of this Japanese Laid Open Application, the preparation of the C-form of TiOPc is described. Other forms obtained are described in Examples II and III.

Processes for the preparation of specific polymorphs of titanyl phthalocyanine, which require the use of a strong acid such as sulfuric acid, are known, and these processes, it is believed, are not easily scalable. One process as illustrated in Konica Japanese Laid Open on Jan. 20, 1989 as 64-17066 (U.S. Pat. No. 4,643,770 appears to be its equivalent), the disclosure of which are totally incorporated herein by reference, involves, for example, the reaction of titanium tetrachloride and phthalodinitrile in 1-chloronaphthalene solvent to produce dichlorotitanium phthalocyanine which is then subjected to hydrolysis by ammonia water to enable the Type II polymorph. This phthalocyanine is preferably treated with an electron releasing solvent, such as 2-ethoxyethanol, dioxane, N-methylpyrrolidone, followed by subjecting the alpha-titanyl phthalocyanine to milling at a temperature of from 50° to 180° C.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339 (D/90198), the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or $\beta$-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio-groups; and mixtures thereof.

As the solvent mixture, there can be selected a strong organic acid, such as a trihaloacetic acid, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment, one solvent mixture is comprised of trifluoroacetic acid and methylene chloride in a ratio of from about 5 parts acid to about 95 parts of methylene chloride to 25 parts acid to 75 parts of methylene chloride. Subsequent to solubilization with the above solvent mixture and stirring for an effective period of time of, for example, from about 5 minutes to several days, the resulting mixture is added to a solvent that will enable precipitation of the desired titanyl phthalocyanine polymorph, such as Type IV, which solvent is comprised of an alcohol such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones such as acetone, methyl ethyl ketone, and butyraldehyde; glycols such as ethylene and propylene glycol and glycerol; polar aprotic solvents such as dimethyl sulfoxide, dimethylformamide and N-methyl pyrrolidone; and water, as well as mixtures of the aforementioned solvents, followed by filtration of the titanyl phthalocyanine polymorph, and washing with various solvents such as, for example, deionized water and an alcohol, such as methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine polymorph, the form of which was determined by the composition of the precipitant solvent. The polymorphic form and purity of the product was determined by XRPD analysis.

Disclosed in U.S. Pat. No. 5,189,156 (D/91152) is a process for the preparation of titanyl phthalocyanine Type I which comprises the reaction of titanium tetraalkoxide and diiminoisoindolene in the presence of a halonaphthalene solvent; and U.S. Pat. No. 5,206,359 (D/91151) is a process for the preparation of titanyl phthalocyanine which comprises the treatment of titanyl phthalocyanine Type X with a halobenzene, the disclosures of which are totally incorporated herein by reference.

Illustrated in copending patent application U.S. Ser. No. 084,107, the disclosure of which is totally incorporated herein by reference, is a photoconductive imaging member comprised of a supporting substrate, a photogenerating layer comprised of photogenerating pigments dispersed in a polystyrene/polyvinyl pyridine $A_n$-$B_m$ block copolymer wherein n represents the number of segments of the A monomer comprising the A block, and m represents the number of segments of the B monomer comprising the B block, and a charge transport layer.

The disclosures of all of the aforementioned documents including U.S. patents are totally incorporated herein by reference.

Specific examples of block copolymers, including percent of monomers and $M_w$ and $M_n$, are illustrated in this application and can be selected for the invention of the present application.

SUMMARY OF THE INVENTION

It is an object of the present invention to provide processes for the preparation of stable titanyl phthalocyanine dispersions with many of the advantages illustrated herein.

It is yet another object of the present invention to provide economical processes for the preparation of imaging members with improved cyclic stability and which members contain titanyl phthalocyanine Type IV.

Another object of the present invention relates to the preparation of photoconductive imaging members from dispersions of titanyl phthalocyanine Type IV and certain AB block copolymers, such as polystyrene/poly-4-vinyl pyridine.

Further, another object of the present invention relates to the preparation of photoconductive imaging members with improved cyclic stability and excellent photosensitivity, especially in the infrared light region, for example from about 700 to about 900 nanometers.

Another object of the present invention resides in a process for the preparation of layered photoconductive imaging members with aryl amine charge transport layers and which members contain a photogenerating layer obtained from a dispersion of titanyl phthalocyanine Type IV and certain AB block copolymers, and wherein these imaging members possess excellent photosensitivity and significant improvements in cyclic stability. The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about $-800$ volts. After resting for 0.5 second in the dark, the charged members attained a surface potential of $V_{ddp}$, dark development potential, and each member was then exposed to light from a filtered Xenon lamp with a XBO 150 watt bulb. The dark decay in volts/second was calculated as $(V_o - V_{ddp})/0.5$. The percent of photodischarge was calculated as $100 \times (V_{ddp} - V_{bg})/V_{ddp}$. The desired wavelength and energy of the exposed light was determined by the type of filters placed in front of the lamp. The broad band white light (400 to 700 nanometers) photosensitivity of these imaging members was measured by using an infrared cut-off filter whereas the monochromatic light photosensitivity was determined using a narrow band-pass filter. The photosensitivity of the imaging members is usually provided in terms of the amount of expose energy in ergs/cm$^2$, designated as $E_{\frac{1}{2}}$, required to achieve 50 percent photodischarge from the dark development potential. The higher the photosensitivity, the smaller is the $E_{\frac{1}{2}}$ value.

These and other objects of the present invention can be accomplished in embodiments thereof by the provision of processes for the preparation of photoresponsive imaging members thereof. More specifically, in embodiments of the present invention there are provided processes for the preparation of layered photoconductive imaging members comprised of a supporting substrate, a photogenerating layer, and a charge transport layer; and wherein the photogenerating layer is prepared and applied from a dispersion of titanyl phthalocyanine Type IV and an AB block copolymer like polystyrene/poly-4-vinyl pyridine dissolved in a suitable organic solvent, such as toluene. More specifically, the photogenerating layer is prepared by a number of various methods such as mixing the titanyl phthalocyanine photogenerating layer coating mixture with steel balls, attritors, paint shakers, sand mills, and the like. Common known grinding medium, such as glass beads, steel balls, ceramic beads, and the like, may be selected in the aforementioned methods. Various effective mixing times may be utilized, such as in the range of from about 2 to about 96, and preferably 6 to 24 hours. The dried, for example by heating, photogenerating layer, from between about 5 to about 90, and preferably about 50 to about 80 weight percent of the mixed photogenerating titanyl phthalocyanine pigment is dispersed in from between about 95 to about 10, and preferably from about 70 to about 12 weight percent of the binder and wherein the solvent, such as known organic solvents, utilized comprises from between about 50 to about 99 and preferably from between about 80 to about 98 weight percent of the mixture. A number of suitable methods may be selected to apply the photogenerating layer coating mixture to, for example, enable the formation of the layered photoconductive imaging member, as illustrated in, for example, U.S. Pat. No. 4,265,660, the disclosure of which is totally incorporated herein by reference, such methods including spraying, dip coating, roll coating, wire wound coating, and the like. In the layered imaging members, the thickness of the photogenerating layer can be from between about 0.05 to about 5, and preferably from between about 0.1 to about 2 microns. Also, in embodiments drying of the deposited photogenerating layer can be accomplished by a number of known methods, such as oven drying, infrared radiation drying, air drying, vacuum drying, and the like, which drying is accomplished primarily to remove solvents selected in the application of the coating.

Examples of AB block copolymers selected in effective amounts of, for example, from about 10 to about 70, and preferably from about 12 to about 50 percent by volume of the total photogenerating layer components include polystyrene/polyvinyl pyridines like polystyrene/poly-4-vinyl pyridine with, for example, a $M_w$ of from about 7,000 to about 80,000, and more preferably from about 10,500 to about 40,000, and a $M_n$ of from about 5,500 to about 60,200 and preferably from about 8,000 to about 22,800, and wherein the percentage of vinyl pyridine is from about 5 to about 55 and preferably from about 9 to about 20.

Solvents selected for dissolving the block copolymers include those that will dissolve, or substantially dissolve the copolymer, such as known organic solvents like toluene, and which solvents can be selected in various effective amounts, such as from between about 50 to about 98, and preferably from between about 80 to about 98 weight percent of the total mixture used.

Numerous different layered photoresponsive imaging members with the phthalocyanine pigment titanyl phthalocyanine dispersions can be fabricated. In embodiments, thus the layered photoresponsive imaging members are comprised of a supporting substrate, a charge transport layer, especially an aryl amine hole transport layer, and situated therebetween a photogenerator layer comprised of titanyl phthalocyanine of Type IV obtained from the AB block copolymer dispersions illustrated herein. Another embodiment of the present invention is directed to positively charged layered photoresponsive imaging members comprised of a supporting substrate, a charge transport layer, especially an aryl amine hole transport layer, and as a top overcoating titanyl phthalocyanine pigment Type IV obtained with the processes of the present invention. Moreover, there is provided in accordance with the present invention an improved negatively charged photoresponsive imaging member comprised of a supporting substrate, a thin adhesive layer, a titanyl phthalocyanine Type IV photogenerator obtained by the processes of the present invention dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members with the titanyl phthalocyanine pigments of the present invention, especially Type IV, are useful in various electrostatographic imaging and printing systems, particularly those conventionally known as xerographic processes. Specifically, the imaging members of the present invention are useful in xerographic imaging processes wherein the titanyl phthalocyanine pigments absorb light of a wavelength of from about 600 nanometers to about 900 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

DESCRIPTION OF SPECIFIC EMBODIMENTS

A negatively charged photoresponsive imaging member of the present invention is comprised of a supporting substrate, thereover a solution coated adhesive layer comprised, for example, of a polyester 49,000, available from E. I. DuPont, Whittaker Company, Goodyear Chemicals and obtained from Morton Interntional Speciality Chemicals Group, a photogenerator layer in contact and coated on the adhesive layer titanyl phthalocyanine, Type IV, dispersed in the diblock copolymer binder, and a top layer in contact with the photogenerating layer, a hole transport layer comprised of N,N'-diphenyl-N,N'-bis(3-methyl phenyl)-1,1'-biphenyl-4,4'-diamine dispersed in a polycarbonate resinous binder.

A positively charged photoresponsive imaging member of the present invention is comprised of a supporting substrate, a charge transport layer comprised of N,N'-diphenyl-N,N'-bis(3-methyl phenyl)-1,1'-biphenyl-4,4'-diamine dispersed in a polycarbonate resinous binder, and a photogenerator layer of a titanyl phthalocyanine Type IV dispersed in the diblock copolymer illustrated herein.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is preferably comprised of the titanyl phthalocyanine pigments obtained with the processes of the present invention dispersed in the diblock copolymer binder. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 85 percent by volume. The maximum thickness of this layer in an embodiment is dependent primarily upon factors, such as photosensitivity, electrical properties and mechanical considerations. The charge generator layer can be obtained by coating the TiOPc dispersion obtained with the processes of the present invention. The dispersion can be prepared by mixing and/or milling the TiOPc in equipment such as paint shakers, ball mills, sand mills and attritors. Common grinding media such as glass beads, steel balls or ceramic beads may be used in this equipment.

The coating of the TiOPc dispersion in embodiments of the present invention can be accomplished with spray, dip, extrusion, or wirebar methods such that the final dry thickness of the charge generator layer is from 0.01 to 30 microns and preferably from 0.1 to 15 microns after being dried at 40° to 150° C. for 5 to 90 minutes.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the charge transporting layer which generally is of a thickness of from about 5 microns to about 75 microns, and preferably of a thickness of from about 10 microns to about 40 microns, include molecules of the following formula

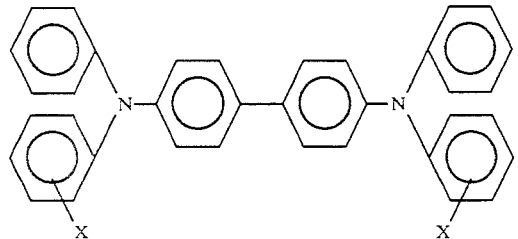

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known charge transport layer molecules can be selected, reference for example U.S. Pat. Nos. 4,921,773 and 4,464,450, the disclosures of which are totally incorporated herein by reference.

Examples of the highly insulating and transparent resinous material or inactive binder resinous material for the transport layers and photogenerating layer in embodiments include known components, such as those illustrated in U.S. Pat. 3,121,006, and the U.S. patents relating to titanyl phthalocyanines mentioned herein, the disclosures of which are totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are provided.

EXAMPLE I

A 250 milliliter three-necked flask fitted with mechanical stirrer, condenser and thermometer maintained under an atmosphere of argon was charged with 1,3-diiminoisoindolene (14.5 grams–0.1 mole), titanium tetrabutoxide (8.5 grams–0.025 mole, available from Aldrich) and 75 milliliters of 1-chloronaphthalene. The mixture was stirred and warmed. At 140° C., the mixture turned dark green and began to reflux. At this time, the vapor (this was identified as n-butanol by gas chromatography) was allowed to escape to the atmosphere until the reflux temperature reached 200° C. The reaction was maintained at this temperature for two hours then was cooled by removal of the heat source to 150° C. The product was filtered through a 150 milliliter M-porosity sintered glass funnel which was preheated to approximately 150° C. with boiling DMF, and then washed thoroughly with three portions of 100 milliliters of boiling DMF, followed by washing with three portions of 100 milliliters of DMF at room temperature, and then three portions of 50 milliliters of methanol, thus providing 10.3 grams (72 percent yield) of a shiny purple pigment which was identified as Type I TiOPc by XRPD.

EXAMPLE II

Preparation of Type IV TiOPc:

Two grams of Type I TiOPc, prepared as described in Example I, were dissolved in 20 milliliters of a mixture of trifluoroacetic acid and methylene chloride (1:4, v/v), and added over a 2 minute period to a rapidly stirred solution of methanol (100 milliliters) and water (100 milliliters). The resultant coarse suspension was stirred at room temperature for 45 minutes then was allowed to settle. The supernatant liquid was decanted and the blue residue was redispersed in 100 milliliters of methanol by stirring for 30 minutes. The suspension was filtered using a 7 centimeter diameter glass fiber filter in a porcelain funnel. The solid was then twice redispersed in 100 milliliters of hot (about 90° C.) deionized water and filtered by vacuum filtration through a 7 centimeter diameter porcelain funnel which was fitted with a Whatman 934-AH grade filter fiber. The solid, which was identified as Type X titanyl phthalocyanine on the basis of its XRPD spectrum, was redispersed in 100 milliliters of monochlorobenzene, filtered and oven dried at a temperature of 70° C. for a period of 1 hour to provide 1.6 grams of a powdery blue pigment which was identified as Type IV titanyl phthalocyanine by XRPD.

EXAMPLE III

A control photoconductive imaging member was prepared by providing a web of titanium with the coated polyester MELINEX ®, available from ICI Americas Inc., substrate having a thickness of 3 mils, and applying thereto with a gravure applicator a blocking layer from a solution containing 50 grams of 3-amino-propyltriethoxysilane, 15 grams of acetic acid, 684.8 grams of 200 proof denatured alcohol and 200 grams of heptane. This layer was then dried for about 5 minutes at 135° C. in a forced air dryer of the coater. The resulting blocking layer had a dry thickness of 500 Angstroms.

An adhesive interface layer was then prepared by applying a wet coating over the above blocking layer, using a gravure applicator, containing 3.5 percent by weight based on the total weight of the solution of copolyester adhesive (49,000 polyester available from Morton International, Specialty Chemicals Group) in a 70:30 volume ratio mixture of tetrahydrofuran/cyclohexanone. The adhesive interface layer was then dried for about 5 minutes at 135° C. in the forced air drier of the coater. The resulting adhesive interface layer had a dry thickness of 620 Angstroms.

The adhesive interface layer was thereafter coated with a photogenerating layer (CGL) containing 70 percent by volume of Type IV titanyl phthalocyanine, and 30 percent by volume of polyvinylbutyral. This photogenerating layer was prepared by introducing 0.18 gram of BM-S polyvinyl butyral and 19 milliliters of n-butyl acetate into a 4 ounce amber bottle. To this solution was added 0.56 gram of Type IV titanyl phthalocyanine and 300 grams of ⅛ inch diameter stainless steel shot. This mixture was then placed on a ball mill for 24 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

This photogenerator layer was overcoated with a charge transport layer. The charge transport layer was prepared by introducing into an amber glass bottle in a weight ratio of 1:1 N,N'-diphenyl-N,N'-bis(3-methylphenyl)-1,1'-biphenyl-4,4'-diamine and MAKROLON ®, a polycarbonate resin having a molecular weight of from about 50,000 to 100,000 available from Farbenfabriken Bayer A.G. The resulting mixture was dissolved in methylene chloride to form a solution containing 15 percent by weight of solids. This solution was applied on the photogenerator layer using a Bird applicator to form a coating which upon drying had a thickness of 25 microns. During this coating process, the humidity was equal to or less than 15 percent. The resulting layered photoreceptor device containing all of the above layers was annealed at 135° C. in a forced air oven for 5 minutes and, thereafter, cooled to ambient room temperature.

EXAMPLE IV

A photoconductive imaging member of the present invention was prepared by providing a web of titanium coated polyester MELINEX ®, available from ICI Americas Inc., substrate having a thickness of 3 mils, and applying thereto with a gravure applicator a blocking layer from solution containing 50 grams of 3-aminopropyltriethoxysilane, 15 grams of acetic acid, 684.8 grams of 200 proof denatured alcohol and 200 grams of heptane. This layer was then dried for about 5 minutes at 135° C. in the forced air dryer of the coater. The resulting blocking layer had a dry thickness of 500 Angstroms.

An adhesive interface layer was then prepared by applying a wet coating over the blocking layer, using a gravure applicator, containing 3.5 percent by weight based on the total weight of the solution of copolyester adhesive (49,000, available from Morton International, Specialty Chemicals Group) in a 70:30 volume ratio mixture of tetrahydrofuran/cyclohexanone. The adhesive interface layer was then dried for about 5 minutes at 135° C. in the forced air dryer of the coater. The resulting adhesive interface layer had a dry thickness of 620 Angstroms.

The adhesive interface layer was, thereafter, coated with a photogenerating layer (CGL) containing 70 percent by volume of Type IV titanyl phthalocyanine, and 30 percent by volume of copolymer polystyrene (90 percent)/poly-4-vinyl pyridine (10 percent) with $M_w$ of 15,000. This photogenerating layer was prepared by introducing 0.18 gram of polystyrene/poly-4-vinyl pyridine and 19 milliliters of toluene into a 4 ounce amber bottle. To this solution was added 0.56 gram of Type IV titanyl phthalocyanine and 300 grams of ⅛ inch diameter stainless steel shot. This mixture was then placed on a ball mill for 24 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

This photogenerator layer was overcoated with a charge transport layer. The charge transport layer was prepared by introducing into an amber glass bottle in a weight ratio of 1:1 N,N'-diphenyl-N,N'-bis(3methylphenyl)-1,1'-biphenyl-4,4'-diamine and MAKROLON ®, a polycarbonate resin having a molecular weight of from about 50,000 to 100,000 commercially available from Farbenfabriken Bayer A.G. The resulting mixture was dissolved in methylene chloride to form a solution containing 15 percent by weight of solids. This solution was applied on the photogenerator layer using a Bird applicator to form a coating which upon drying had a thickness of 25 microns. During this coating process the humidity was equal to or less than 15 percent. The resulting photoreceptor device containing all of the above layers was annealed at 135° C. in a forced air oven for 5 minutes and thereafter cooled to ambient room temperature.

EXAMPLE V Through EXAMPLE VIII

Photoreceptors were prepared by repeating the processes of Example IV except that polystyrene/poly-4-vinyl pyridine copolymers described in Table 1 were used in the CGL (charge generation layer).

TABLE 1

| EXAMPLE NO. | $M_w$ | PERCENT OF 4-VINYL PYRIDINE |
|---|---|---|
| V | 26,100 | 9.1 |
| VI | 16,300 | 55.2 |
| VII | 10,700 | 9.5 |

TABLE 1-continued

| EXAMPLE NO. | $M_w$ | PERCENT OF 4-VINYL PYRIDINE |
|---|---|---|
| VIII | 15,300 | 9.6 |

The xerographic electrical properties of the imaging members were determined by electrostatically charging the surfaces thereof with a corona discharge source to a surface charge density of $1.2 \times 10^{-7}$ coulombs/cm$^2$ as measured by a capacitively coupled probe attached to an electrometer. The dark development potential, $V_{ddp}$, was measured 0.66 second after charge using an electrostatic voltmeter with the samples kept in the dark. The sample is then exposed to a xenon arc lamp to discharge the member to residual surface potential of approximately 20 volts. After 10,000 charge/erase cycles, the $V_{ddp}$ was again measured. The devices of this invention exhibited less loss of $V_{ddp}$ over the 10,000 cycles than the control of Example III, reference Table 2 that follows.

TABLE 2

| | $V_{ddp}$ INITIAL | Vddp 10,000 CYCLES | PERCENT CYCLE DOWN |
|---|---|---|---|
| Control 1 | 1077 | 930 | 13.6 |
| Control 2 | 1075 | 922 | 14.2 |
| Control 3 | 1046 | 922 | 11.9 |
| Invention Example IV | 1037 | 963 | 7.1 |
| Invention Example V | 1057 | 982 | 7.1 |
| Invention Example VI | 1047 | 995 | 5.0 |
| Invention Example VII | 1081 | 994 | 8.0 |
| Invention Example VIII | 1068 | 982 | 8.1 |

This illustrates cyclic stability as measured in a laboratory testing scanner. Control samples show a decrease in $V_{ddp}$ from 1046 to 1077 to 922 to 930 volts over 10,000 imaging test cycles. This corresponds to 12 to 14 percent cycle down. The invention samples show a decrease in Vdd$_p$ from 1037 to 1081 to 963 to 994, a much lower 5 to 8 percent cycle down. Poor stability on a lab scanner translates to shortened life, about 30 percent, in a xerographic machine because of a continuing need to increase the charge current to maintain the set up value of Vdd$_p$.

SYNTHESIS OF STYRENE-b-4-VINYLPYRIDINE COPOLYMERS

General Experimental:

All syringes and syringe needles were dried in an oven at 125° C., and cooled in a desiccator containing calcium chloride. Tetrahydrofuran was dried over and distilled from sodium/benzophenone under an argon atmosphere. Styrene and α-methylstyrene were vacuum distilled from sodium hydride and stored under a blanket of argon. 4-Vinylpyridine was vacuum distilled from calcium hydride and stored under a blanket of argon. N-Butyllithium in cyclohexane was used as received from Aldrich Chemical and titrated with diphenylacetic acid, just prior to use. All reactions were accomplished with a Buchi Type 1 Autoclave fitted with a 1 liter kettle. The reaction kettle was flushed with argon gas and dried using a solution of n-butyllithium. Throughout the synthesis of the copolymer, a positive pressure of argon was maintained in the reaction kettle.

Preparation of Styrene-b-4-vinylpyridine Copolymers:

To the reactor kettle was added dry tetrahydrofuran (500 milliliters), followed by cooling to −50° C. The initiator solution was prepared in a separate pot by the dropwise addition of n-butyllithium (4.0 milliliters, 1.93 molar, 7.7 millimols) to α-methylstyrene (1.0 milliliter, 7.7 millimols) in tetrahydrofuran (25 milliliters). Without delay, a portion of the deep red initiator solution (18 milliliters, 4.6 millimols) was transferred to the reaction kettle followed by styrene monomer (73.8 grams, 709 millimols). There was an immediate color change from red to orange. After 15 minutes, 4-vinylpyridine monomer (8.8 grams, 84 millimols) was added to give a pale orange solution. The bath temperature was raised to −10° C. and the reaction was quenched with methanol. The styrene/4-vinyl pyridine block copolymer was precipitated from the reaction mixture by dropwise addition into 6 liters of deionized water. The product was isolated by filtration and dried to constant weight in a vacuum oven at 70° C. to provide a 98 percent yield; $M_n = 19,200$; $M_w = 21,700$; styrene 89.6 percent and 4-vinylpyridine 10.4 percent.

In embodiments, the polystyrene-4-vinylpyridine copolymer has a $M_w$ in the range of 8,000 to about 35,000 and contains from about 8 to about 20 weight percent.

Other modifications of the present invention may occur to those skilled in the art subsequent to a review of the present application and these modifications, including equivalents thereof, are intended to be included within the scope of the present invention.

What is claimed is:

1. A process for the preparation of a photogenerating composition consisting essentially of mixing titanyl phthalocyanine Type IV with the AB block copolymer polystyrene-4-vinyl pyridine in a suitable solvent, and wherein said block copolymer has a weight average molecular weight of from about 7,000 to about 80,000.

2. A process in accordance with claim 1 wherein the solvent is toluene.

3. A process in accordance with claim 1 wherein there is formed a stable dispersion of said phthalocyanine in said copolymer.

4. A process in accordance with claim 1 wherein said mixing is accomplished for from between about 2 to about 96 hours, from between about 5 to about 90 weight percent of said Type IV titanyl phthalocyanine is selected, and from between about 95 to about 10 percent by weight of said block copolymer is selected.

5. A process in accordance with claim 1 wherein the charge generator thickness is from about 0.1 to about 1 micron.

6. A process for the preparation of a layered photoconductive imaging member consisting essentially of depositing on a supporting substrate a stable dispersion of titanyl phthalocyanine Type IV, which dispersion is obtained by mixing titanyl phthalocyanine Type IV with the AB block copolymer polystyrene-4-vinyl pyridine in a suitable solvent, and thereafter applying a charge transport layer, and wherein said copolymer polystyrene-4-vinyl pyridine possesses a weight average molecular weight of from about 7,000 to about 8,0000.

7. A process in accordance with claim 6 wherein the solvent is toluene.

8. A process in accordance with claim 6 wherein the supporting substrate is comprised of a metal or a polymer.

9. A process in accordance with claim 6 wherein the charge transport layer is applied from a solution and is comprised of aryl amine molecules dispersed in a resin binder.

10. A process in accordance with claim 6 wherein said imaging member has a cyclic stability for extended time periods.

11. A process in accordance with claim 6 wherein said imaging member exhibits a cycle down of $V_{ddp}$ of less than 100 volts after 50,000 imaging cycles in a xerographic imaging apparatus.

12. A process in accordance with claim 10 wherein said time period is about 10,000 to about 50,000 imaging cycles in a xerographic imaging apparatus.

13. A process in accordance with claim 10 wherein the cycle down is reduced by about 50 percent.

14. A process in accordance with claim 1 wherein said mixing is accomplished by ball milling methods, or paint shaking methods.

15. A process in accordance with claim 1 wherein said copolymer has a $M_w$ of from about 10,500 to about 40,000.

16. A process in accordance with claim 1 wherein said copolymer contains from about 8 to about 55 percent of vinyl pyridine.

17. A process in accordance with claim 1 wherein said copolymer has a $M_w$ of from about 11,000 to about 30,000.

18. A photoconductive imaging member comprised of a supporting substrate, the photogenerating layer of claim 1, and a charge transport layer.

19. A process in accordance with claim 1 wherein said copolymer has a weight percent of 4-vinyl pyridine of 9.1, 55.2, 9.5, and 9.6, and the corresponding weight average molecular weight is 26,100, 16,300, 10,700, and 15,300, respectively.

20. A process in accordance with claim 1 wherein said copolymer has a number average molecular weight of from about 5,500 to about 60,200.

21. A process in accordance with claim 1 wherein said copolymer has a number average molecular weight of from about 8,000 to about 22,800.

22. A process in accordance with claim 1 wherein the percentage of vinyl pyridine in said copolymer is from about 5 to about 55 percent.

23. A process in accordance with claim 1 wherein the percentage of vinyl pyridine in said copolymer is from about 9 to about 20 percent.

24. An improved process for the preparation of stable photogenerating pigments for utilization in a photoconductive imaging member and wherein the photogenerating pigment is comprised of titanyl phthalocyanine mixed with a binder resin, the improvement residing in selecting as the binder resin a copolymer of polystyrene-4-vinyl pyridine in a solvent and wherein said copolymer contains 9.1 weight percent, 55.2 weight percent, 9.5 weight percent, or 9.6 weight percent of 4-vinyl pyridine, and the corresponding weight average molecular weight is 26,100, 16,300, 10,700 and 15,300, respectively.

* * * * *